United States Patent [19]

Kennedy et al.

[11] Patent Number: 4,969,593
[45] Date of Patent: * Nov. 13, 1990

[54] METHOD FOR DIFFUSION BONDING OF METALS AND ALLOYS USING MECHANICAL DEFORMATION

[75] Inventors: James R. Kennedy, Huntington; Edmund Y. Ting, Flushing, both of N.Y.

[73] Assignee: Grumman Aerospace Corporation, Bethpage, N.Y.

[*] Notice: The portion of the term of this patent subsequent to Mar. 22, 2005 has been disclaimed.

[21] Appl. No.: 221,587

[22] Filed: Jul. 20, 1988

[51] Int. Cl.$^5$ .............................................. B23K 20/22
[52] U.S. Cl. .............................. 228/193; 148/11.5 A
[58] Field of Search .................. 228/193, 203, 263.17, 228/157, 172; 148/11.5 A, 902

[56] References Cited

U.S. PATENT DOCUMENTS

| | | |
|---|---|---|
| 3,552,898 | 1/1971 | Bird et al. . |
| 3,619,548 | 11/1971 | Cavagnero . |
| 3,680,197 | 8/1972 | Blum et al. . |
| 3,758,741 | 9/1973 | Holko et al. . |
| 3,798,748 | 3/1974 | Holko ................................... 228/193 |
| 3,815,219 | 6/1974 | Wilson . |
| 3,997,369 | 12/1976 | Grimes .......................... 148/11.5 A |
| 4,415,374 | 11/1983 | Young ............................. 148/11.5 A |
| 4,452,389 | 5/1984 | Amin . |
| 4,499,156 | 2/1985 | Smith ................................. 228/193 |
| 4,528,042 | 7/1985 | Ward ............................. 148/11.5 A |
| 4,531,977 | 7/1985 | Mishima ....................... 148/11.5 A |
| 4,722,469 | 2/1988 | Rydstad ............................. 228/203 |
| 4,732,312 | 3/1988 | Kennedy . |
| 4,770,848 | 9/1988 | Ghosh ............................ 148/11.5 A |

FOREIGN PATENT DOCUMENTS 0090384 5/1983 Japan ................................... 228/203
287069 1/1978 U.S.S.R. .

OTHER PUBLICATIONS

Irving, Robert R., "Amorphous Metals: The New Metallurgy," Iron Age, May 11, 1983, pp. 47–52.
Jones, H., "The Status of Rapid Solidification of Alloys in Research and Application," Journal of Materials Science 19 (1984) pp. 1043 and 1044.

Primary Examiner—Kurt Rowan
Attorney, Agent, or Firm—Pollock, Vande Sande & Priddy

[57] ABSTRACT

Diffusion bonding of aluminum alloy objects of different sizes and shapes may be greatly improved when the surface of the object is exposed to a mechanical deformation cycle which forms a cold-worked surface microstructure, followed by a heat treatment cycle to produce recrystallization of the surface layer. The method of the invention results in the formation of finer grains at the surface which enhances the strength of a diffusion bond.

7 Claims, 3 Drawing Sheets

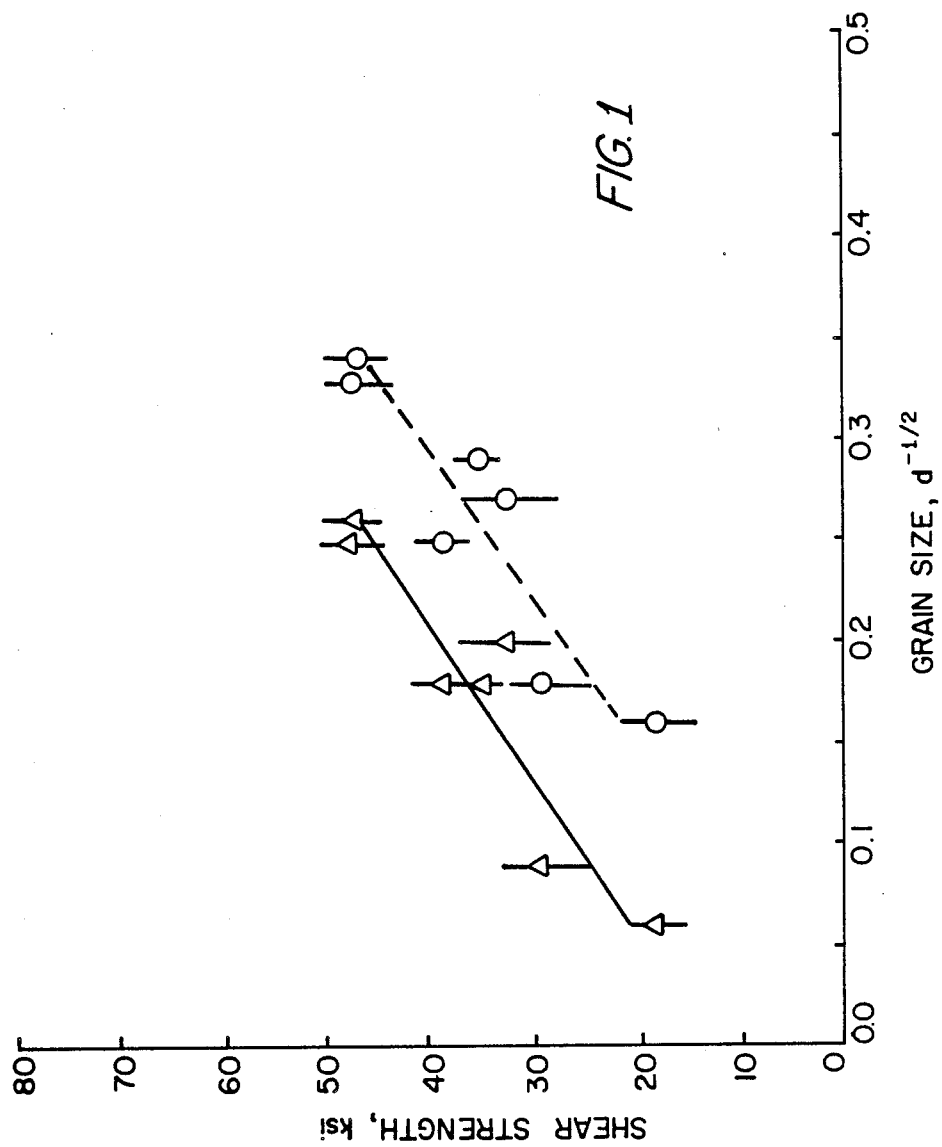

METHOD FOR DIFFUSION BONDING OF METALS AND ALLOYS USING MECHANICAL DEFORMATION

FIELD OF THE INVENTION

The present invention relates to diffusion bonding, and more particularly to the diffusion bonding of alloy materials having plate or irregular shapes.

BACKGROUND OF THE INVENTION

As explained in our U.S. Pat. No. 4,732,312, which issued on Mar. 22, 1988, the combined use of superplastic forming and diffusion bonding (SPF/DB) offers the potential to manufacture lighter and less expensive aircraft structures than those made by conventional means. It is particularly attractive for sheet metal structures because part and fastener counts could be reduced, thereby significantly decreasing assembly labor. Also the fabrication of structures to near-net shapes using SPF/DB technology can improve material utilization and reduce machining time and costs.

The application of SPF/DB to titanium alloys has been well demonstrated but this is not the case for advanced high strength aluminum alloys. Although impressive SPF behavior has already been demonstrated for aluminum alloys, such as 7475, and work has begun on developing superplastic properties for Al-Li alloys, the diffusion bonding technology for these materials is lagging. A simple and cost-effective diffusion bonding technique compatible with SPF technology could significantly advance the use of aluminum structures.

In diffusion bonding, flattening of the abutting surfaces is necessary in order to achieve intimate interfacial contact. Metals like titanium, which have surface oxides that easily dissolve in the metal during heating, can be readily diffusion bonded without the use of special surface preparations or interlayer diffusion aids. Unlike titanium, aluminum and its alloys (as well as, for example, zirconium and vanadium and their respective alloys) form insoluble oxides which do not readily dissolve during bonding and thus act as barriers to intimate metal-to-metal contact and subsequent diffusion.

Typically, aluminum has been diffusion bonded by methods which rely upon considerable deformation (up to 60 percent) and pressure (up to 40,000 psi) to rupture surface materials to dissolve oxides and aid diffusion. In general, such methods are not compatible with the constraints imposed by SPF technology or the mechanical property requirements of a high performance structure. For example, practical limitations set by production equipment dictate that SPF pressures probably should be limited to 1,000 psi and perhaps should be much lower. In addition, other variables important to SPF, such as starting microstructure, dwell time, forming rate, dynamic recrystallization, and post heat treatment must be considered.

Aluminum has also been diffusion bonded by removing the surface oxide layers by sputtering or other suitable techniques in a hard vacuum or reduced pressure inert gas environment in order to prevent the oxide layer from being formed again before bonding. However, pressures below $10^{-9}$ Torr must be maintained in order to keep the oxide layer from forming again almost instantly in a hard vacuum and pressures of approximately $10^{-6}$ Torr in an inert gas environment are desirable. In other words, using these techniques, the cleaned surfaces cannot be exposed to air prior to bonding. It is generally believed that cleaning techniques such as abrading, chemical etching or dissolving the oxide by use of fluxes, if carried out in a vacuum or low pressure inert gas environment, to preserve the oxide cleaned surface, present problems in controlling removal of oxides from the work, etching solutions or the process chamber.

In our U.S. Pat. No. 4,732,312, a method is discussed for achieving diffusion bonding of surface layers of an alloy sheet, such as aluminum, having surface oxide coatings of low solubility in the alloy. The discussed method comprises the steps of: treating said alloy so that at least the surface layers to be bonded have a fine grain structure; removing existing surface oxide coatings from the surface layers to be bonded; diffusion bonding the surface layers to one another by placing the alloy to be bonded under a pressure sufficient to cause disruption of the oxide coatings and insufficient to cause macroscopic deformation of the alloy, while heating the alloy in a non-oxidizing atmosphere for a time sufficient for diffusion bonding to occur. Generally, the deformation will approach zero percent or a very low amount on a macroscopic scale. Pressures of less than 1,000 psia and preferably less than 100 psia may be applied to force the surfaces together. The diffusion bonding generally takes place at temperatures below the melting point of the alloy by several degrees centigrade or at the superplastic forming temperature for a time ranging between one and ten hours. At least one part of the diffusion bonded assembly may be superplastically formed to produce a structurally useful component of a predetermined configuration.

More important to the present invention, the method of our mentioned patent may also comprise the step of treating alloy sheets so that the alloy, or at least the surface layers thereof, have a fine grain structure of the type associated with superplastic forming properties. This is done by thermomechanically processing the surface layers of the sheets by heated rollers. Enhanced localized surface deformation of such alloys during bonding resulting from the superplastic microstructure leads to extensive oxide film disruption, thus facilitating bonding.

After diffusion bonding (and superplastic forming) the bonded structure may be further heat treated by solution treating, quenching and aging.

The surfaces to be bonded are prepared by abrading with successively finer grades of grinding paper, rinsing with water, abrading with a metallic brush, and removing the brushings. The abrading may be performed by abrading in a first direction, and abrading in a second direction substantially at right angles to the first direction. The brushings may be removed by exposing the surfaces to a stream of filtered compressed air moving at a velocity sufficiently high to remove the brushings.

Pressure may be applied to the components to be bonded by forcing the surfaces together by placing the components in a fixture, exposing a first opposite surface to a first surface layer to be diffusion bonded to one of a partial vacuum and a pressurized gas and exposing a second opposite surface to a second surface layer to be diffusion bonded to another of said partial vacuum and pressurized gas.

Although the method of our patent achieves success with sheet materials, thermomechanical rolling of thick plates, bars, and irregularly shaped alloy materials is impractical or impossible, thereby preventing surface treatment of these materials to achieve surface fine grain structure of the type associated with superplastic microstructure.

BRIEF DESCRIPTION OF THE PRESENT INVENTION

The present invention is directed to an improvement of the surface treatment disclosed in our mentioned patent. Whereas that application was directed to treating at least the surface layers of sheet material with thermomechanical means, a need still exists for creating a surface microstructure in alloy materials, such as aluminum, which are fabricated in thicker plates or irregularly shaped objects. The improvement of the present invention is centered about the discovery that the surface layers of alloy materials having any shape may be modified by a basic two-phase method including cold working mechanical deformation followed by a heat treatment to produce a fine-grained microstructure that will enhance diffusion bonding. The great advantage of such a method is that it could permit superplastic conditioning of thin surface layers for subsequent diffusion bonding of practically any metallic material and for components in virtually any size or shape. This could lead to the fabrication of unique hybrid structures wherein the main thickness of the material is not fine-grained and superplastic while the near surface layers are fine-grained and superplastic.

BRIEF DESCRIPTION OF THE FIGURES

The above-mentioned objects and advantages of the present invention will be more clearly understood when considered in conjunction with the accompanying drawings, in which:

FIG. 1 is a graphical plot of two alloy samples comparing grain size with bond strength;

DETAILED DESCRIPTION OF THE INVENTION

The proposed invention is a method for fabricating diffusion bonded or superplastically formed and diffusion bonded (SPF/DB) structures, wherein any metal or alloy, which may or may not be initially superplastic, is joined at selected areas by diffusion bonding. According to such method, the metal or alloy to be diffusion bonded is first subjected to a prescribed surface treatment for the purpose of modifying its surface properties. The modification involves cold working mechanical deformation of the surface. Such treatment results in a deformed microstructure ready for recrystallization. The mechanical deformation is followed by a thermal treatment to finalize a fine grain structure in a surface layer. The mechanical deformation may be accomplished by hammering or shot peening which cold works the microstructure in the surface layer while ensuing thermal treatment produces recrystallization to produce the desirable fine grained structure in the surface layer. Control of the shot size, density and impingement force will result in an optimized microstructure which is suitable for subsequent diffusion bonding. As a result of the dual step method of the present invention, a thin layer of fine grain, superplastic material can be produced in an otherwise non-superplastic material Similarly, a thin metastable surface layer will subsequently undergo transformation to a desired microstructure either before or during the thermal cycle imposed by diffusion bonding. Diffusion bonding will be greatly enhanced in surface modified materials because of improved flow and contact of the mating pieces. Furthermore, in metals with stable oxides, such as aluminum and its alloys, diffusion bonding will be further enhanced after surface modification because of increased surface movements during bonding which lead to the disruption and break-up of surface oxides.

FIG. 1 indicates two graphical plots to dramatize the bond strength increases with fine grain size. Each of the plots represents a separate sample of 7475-T6 aluminum alloy. Each plot illustrates the linear increase of shear strength (bond strength) as a function of smaller grain size.

The present invention recognizes the desirability for achieving fine grain size near the surface of alloy material and overcomes the previous limitation that such fine grain size associated with superplastic alloy materials could only be achieved with relatively thin sheet materials.

Figure 2A:
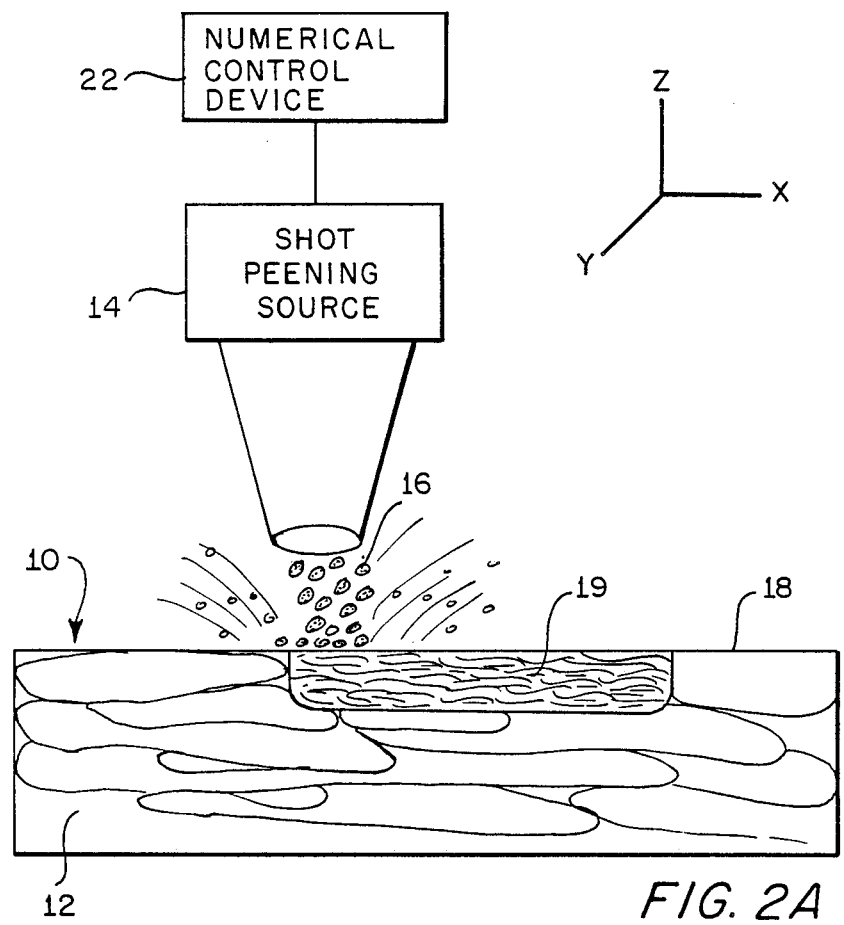
FIG. 2A is a schematic illustration of a first phase of the present method wherein a surface microstructure is cold worked.

FIG. 2A schematically illustrates an alloy block 10 which is not superplastic as supplied. Thus, the alloy is comprised of relatively large grains, as indicated by reference numeral 12. In order to produce a fine grained layer near the surface of the plate, the present invention utilizes two principal steps. In FIG. 2A, mechanical deformation of a surface layer is illustrated. More particularly, plastic deformation of the surface layer is accomplished at room temperature which causes strain hardening and a cold-worked, distorted microstructure. Although a shot peening source 14 is illustrated in FIG. 2A, other alternatives may include forging, swaging, cold rolling, coining, and hammering.

Subsequent to the metal deformation is the application of heat which will induce recrystallization leading to a new fine-grained, strain-free material at the surface of the block 10. The grain refinement resulting from this method corresponds to a superplastic surface condition. The refined grain microstructure resulting at the end of the present method is schematically illustrated at the surface 18 by reference numeral 20.

In a preferred embodiment of the present invention, the metal deformation of the block surface is produced by shot peening source 14 which directs a flow of shot at the surface 18 of the plate. In order to move the energy source 14 relative to the plate surface 18, it is possible to utilize a conventional numerical control device 22, such as is prevalently utilized in robotics and machine tool controls. In the case of a flat block 10, as shown in FIG. 2A, the control device need move the energy source 14 at a constant speed across the surface 18 so that each point receives substantially the same amount of shot from the source. Alternatively, the block 10 may be moved relative to a stationary source 14. This would typically involve a movable table (not shown) upon which the block rests. The table would be moved in the x-y plane by a numerical control device such as 22. This will result in a desirable uniform grain reduction along a surface layer. Thus, in such an application the shot source and plate need only undergo relative translational motion along x and y coordinates. Routine experimentation is necessary to determine the shot size, density and impingement force necessary to achieve a cold-worked microstructure in the surface layer of the block.

Figure 2B:
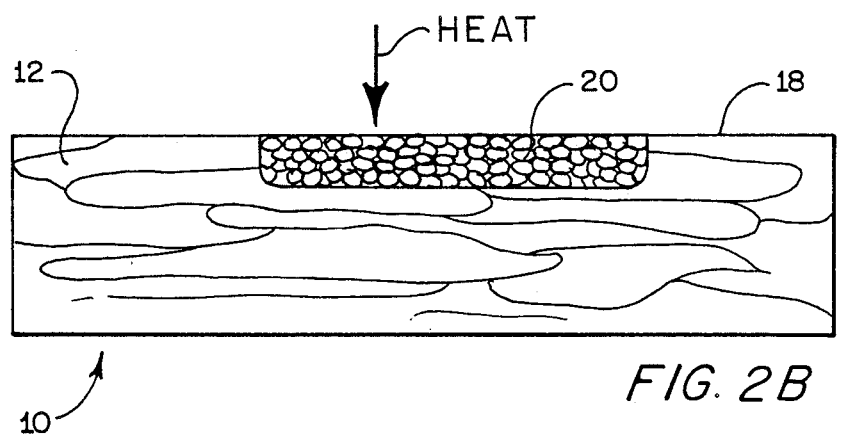
FIG. 2B is a schematic illustration indicating a subsequent phase of the present method wherein thermal treatment produces a fine grained surface layer structure by recrystallization.

After this occurs, the next phase of the method is followed as indicated in FIG. 2B wherein the plate is heated to cause recrystallization of the deformed layer. The heating can be achieved by any conventional heat source and the time and temperature may be determined by routine experimentation wherein recrystallization of the deformed layer is observable. Of course, if just a small area of the surface is to be treated, the entire block need not be subjected to heat. It should also be mentioned that the heat treatment may occur either before or during the diffusion bonding process.

The significant advantage of the present invention is that it is capable of operating with various alloys, whether they are supplied as a superplastic, or non-superplastic material A still further significant advantage is the ability of the present invention to refine the grain in an alloy object having almost any shape and thickness. Of course, in the event a non-planar object is to be worked upon, the numerical control device 22 must be capable of undergoing three-dimensional motion along x, y and z coordinates. Many types of appropriate numerical control devices for accomplishing these ends are commercially available.

As a result of the method of the invention, the surface is modified as a result of two major steps, the first being mechanical deformation of a surface layer and the second being heat treatment for recrystallization of the deformed layer. Such treatment results in the formation of microcrystalline or metastable phases, depending on structural and kinetic factors. The result of the method is the production of a thin layer of fine grain, superplastic material in an otherwise non-superplastic material Diffusion bonding will be greatly enhanced in surface modified materials because of improved flow and contact of the mating pieces. Furthermore, in metals with stable oxides, such as aluminum and its alloys, diffusion bonding will be further enhanced after surface modification because of increased surface movements during bonding which lead to the disruption and break-up of surface oxides.

Figure 3A:
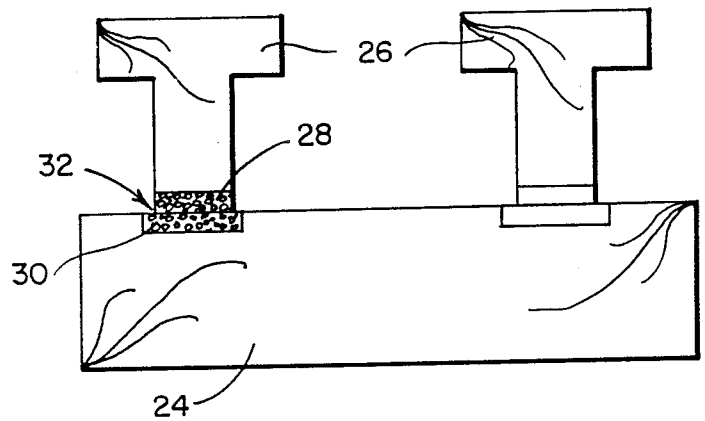
FIG. 3A is a diagrammatic sectional view illustrating the diffusion bonding between refined grain structures at the interface of extrusions and a baseplate.
Figure 3B:
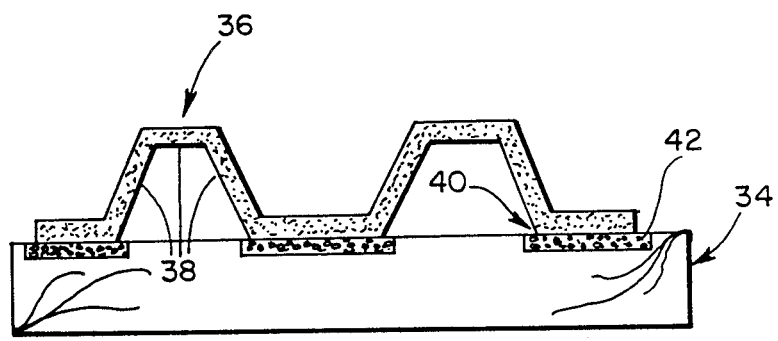
FIG. 3B is a diagrammatic cross-sectional view illustrating diffusion bonding between a fine-grained superplastic sheet and a fine-grained region in the surface layer of a baseplate.

FIGS. 3A and 3B are diagrammatic sectional views of structures indicating the regions which achieve diffusion bonding. In FIG. 3A a baseplate 24 has several parallel spaced extrusions 26 mounted thereto. The mounting is accomplished by diffusion bonding between a baseplate 24 and a plurality of parallel spaced extrusions 26. More particularly, a fine-grained region 28 in each extrusion 26 is brought into diffusion contact with a mating fine-grained region 30 in the baseplate 24. Diffusion bonding between these fine-grained regions will occur at interface 32.

Similarly, diffusion bonding may be achieved between a fine-grained superplastic sheet 36 and baseplate 34. The diagrammatic cross-sectional view of FIG. 3B indicates that the sheet 36 is characterized by a fine-grained superplastic body 38. Several spaced fine-grained regions 42 characterize the upper surface of plate 34 and the intention is for base sections of the sheet 36 to contact (40) the fine-grained areas 42 of the base so that diffusion bonding therebetween may be realized.

It should be understood that the invention is not limited to the exact details of construction shown and described herein for obvious modifications will occur to persons skilled in the art.

We claim:

1. A method for enhancing diffusion bonding for an object made of an alloy, the method comprising the steps:
projecting at least one mechanical body against surface area points of said object to develop a cold-worked surface microstructure by impinging mechanical forces,
elevating the temperature of the surface area to produce recrystallization of the surface area only and
cooling the surface area until the recrystallized surface forms a fine grained microstructure exhibiting superplastic properties.

2. The method set forth in claim 1 wherein the forces are generated by shot peening.

3. The method set forth in claim 1 wherein the forces are generated by hammering.

4. The method set forth in claim 1 wherein the forces are generated by forging.

5. The method set forth in claim 1 wherein the forces are generated by swaging.

6. The method set forth in claim 1 wherein the forces are generated by coining.

7. The method set forth in claim 1 wherein the step of cooling the exposed area results in an intermediate metastable phase, capable of transforming to a fine-grained microstructure either before or during bonding.

* * * * *